(12) United States Patent
Yoneyama et al.

(10) Patent No.: US 10,125,408 B2
(45) Date of Patent: Nov. 13, 2018

(54) METHOD FOR MANUFACTURING NICKEL AND COBALT MIXED SULFIDE AND NICKEL OXIDE ORE HYDROMETALLURGICAL METHOD

(71) Applicant: SUMITOMO METAL MINING CO., LTD., Tokyo (JP)

(72) Inventors: Tomoaki Yoneyama, Tokyo (JP); Hiroyuki Mitsui, Tokyo (JP); Manabu Enomoto, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 15/561,695

(22) PCT Filed: Dec. 8, 2015

(86) PCT No.: PCT/JP2015/084427
§ 371 (c)(1),
(2) Date: Sep. 26, 2017

(87) PCT Pub. No.: WO2016/157629
PCT Pub. Date: Oct. 6, 2016

(65) Prior Publication Data
US 2018/0105896 A1    Apr. 19, 2018

(30) Foreign Application Priority Data
Apr. 1, 2015   (JP) ................................. 2015-075062

(51) Int. Cl.
| C22B 23/00 | (2006.01) |
| C22B 3/00 | (2006.01) |
| C22B 3/44 | (2006.01) |
| B01D 53/14 | (2006.01) |
| C01B 17/16 | (2006.01) |
| C22B 3/08 | (2006.01) |

(52) U.S. Cl.
CPC ........ *C22B 23/043* (2013.01); *B01D 53/1468* (2013.01); *C01B 17/165* (2013.01); *C22B 3/08* (2013.01); *C22B 3/44* (2013.01); *C22B 23/00* (2013.01); *Y02P 10/234* (2015.11)

(58) Field of Classification Search
CPC .............. C22B 23/00; C22B 3/08; C22B 3/44

USPC ......................................... 423/140–142, 566
See application file for complete search history.

(56) References Cited

U.S. PATENT DOCUMENTS

| 4,110,400 | A | 8/1978 | Jha et al. | |
| 7,563,421 | B2* | 7/2009 | Kobayashi | ............ C22B 23/043 423/140 |
| 8,716,177 | B2* | 5/2014 | Shibayama | ............ C01G 53/11 423/150.1 |
| 2005/0265910 | A1 | 12/2005 | Kobayashi et al. | |
| 2010/0135878 | A1 | 6/2010 | Shibayama et al. | |
| 2015/0151991 | A1 | 6/2015 | Higuchi et al. | |

FOREIGN PATENT DOCUMENTS

| CN | 104321449 A | 1/2015 |
| JP | 2005-350766 A | 12/2005 |
| JP | 2006-144102 A | 6/2006 |
| JP | 2010-126778 A | 6/2010 |

OTHER PUBLICATIONS

International Search Report dated Mar. 8, 2016, issued for PCT/JP2015/084427.
Supplementary European Search Report dated Aug. 10, 2018, issued for the European patent application No. 15887771.2.
Office Action dated Aug. 29, 2018, issued to CN Patent Application No. 201580078138.6.

* cited by examiner

*Primary Examiner* — Steven J Bos
(74) *Attorney, Agent, or Firm* — Locke Lord LLP

(57) ABSTRACT

Provided is a method for manufacturing a nickel and cobalt mixed sulfide that is capable of stabilizing nickel and cobalt concentrations in the sulfidation end solution at low levels and of limiting decreases in nickel and cobalt recovery rates without increasing cost even when processing with a sulfuric acid acidic solution containing nickel and cobalt and a high iron ions concentration as the sulfidation start solution. This method generates a sulfidation reaction by blowing hydrogen sulfide gas into a sulfuric acid acidic solution comprising nickel and cobalt to obtain a mixed sulfide, wherein: the sulfuric acid acidic solution, which is the sulfidation start solution, contains iron ions at a rate of 1.0-4.0 g/L; and the sulfidation reaction is generated by blowing hydrogen sulfide gas into the sulfidation start solution and adding sodium hydrogensulfide (NaHS) obtained by absorbing hydrogen sulfide gas-containing exhaust gas, generated by the sulfidation, in an alkaline solution.

17 Claims, 4 Drawing Sheets

METHOD FOR MANUFACTURING NICKEL AND COBALT MIXED SULFIDE AND NICKEL OXIDE ORE HYDROMETALLURGICAL METHOD

TECHNICAL FIELD

The present invention relates to a method for manufacturing a nickel and cobalt mixed sulfide, and more specifically to a method for manufacturing a nickel and cobalt mixed sulfide from a sulfuric acid solution containing nickel and cobalt by a sulfidation reaction and a nickel oxide ore hydrometallurgical method in which the manufacturing method is applied to a sulfidation step.

BACKGROUND ART

In the wet smelting of nickel from a nickel oxide ore, as a sulfidation step, a treatment is carried out in which a sulfidation reaction is caused under pressure by using a leachate containing nickel and cobalt as a sulfidation starting solution so that a nickel and cobalt mixed sulfide is manufactured while impurities are separated. By causing the sulfidation reaction under pressure in this way, particularly, zinc, copper, and the like can be separated and such a treatment is practically used.

Herein, in the sulfidation step, mainly, a reaction represented by the following Reaction Formula (i) proceeds. As represented in Reaction Formula (i), in the sulfidation step, the [H$^+$] ion concentration in the solution increases according to the progress of the reaction, and the pH decreases according to the progress of the reaction.

$$H_2S + NiSO_4 \rightarrow H_2SO_4 + NiS \qquad (i)$$

However, when the pH of the solution decreases according to the progress of Reaction Formula (i), generated NiS is redissolved, and thus the nickel concentration in the solution at a terminating point of the reaction increases and the nickel recovery rate is deteriorated. Therefore, in a case where the pH of the sulfidation starting solution is low, the pH of the end solution also becomes lower, and thus the nickel recovery rate decreases.

Further, in the sulfidation step, when the amount of iron ions, which are more difficult to separate than other metals, is increased, a reaction represented by the following Reaction Formula (ii) is promoted, and similarly to the sulfidation of nickel, the [H$^+$] ion concentration in the solution increases and the pH decreases according to the progress of the reaction.

$$H_2S + FeSO_4 \rightarrow H_2SO_4 + FeS \qquad (ii)$$

Regarding the relationship between the iron ions concentration in the sulfidation starting solution and the nickel ions in the end solution, the amount of nickel ions in the end solution increases according to the increase of the iron ions concentration. That is, this means that the nickel recovery rate decreases according to the increase of the iron ions concentration. Since the iron ions concentration in the sulfidation starting solution depends on an operation parameter in a step prior to the sulfidation step in the nickel oxide ore hydrometallurgical method, the iron ions concentration in the starting solution at the time of starting the sulfidation step is not uniform but is in a "nonuniformly distributed state."

Therefore, in this sulfidation step, in order to suppress a decrease in the nickel recovery rate, there is a demand for coping with the "nonuniformly distributed state" of the iron ions concentration in the sulfidation starting solution.

Patent Document 1 discloses a method for recovering sulfide precipitates in which the molar ratio S/(Ni+Co) is controlled to a value of 1.05 or less equivalent to that of the sulfide generated by using hydrogen sulfide, desirably to a value near 1 which is a stoichiometric composition of NiS and CoS, as a method for precipitating and recovering a nickel and/or cobalt sulfide by adding alkali sulfide to an acidic aqueous solution containing nickel and/or cobalt. Specifically, a method is disclosed in which after the inside of a reaction container is set to be under a non-oxidizing gas atmosphere, alkali sulfide is added to an aqueous solution and the sulfide is formed by precipitation, while maintaining the oxidation-reduction potential (Ag/AgCl electrode standard) at −300 mV to 100 mV.

However, in the method of Patent Document 1, new alkali sulfide such as Na$_2$S or NaHS is used, resulting in a significant increase in cost. From this point, there is a demand for a method for manufacturing a nickel and cobalt mixed sulfide by which a decrease in nickel recovery rate can be suppressed even when the iron ions concentration in the sulfidation starting solution is increased without using new alkali sulfide.

Patent Document 1: Japanese Unexamined Patent Application, Publication No. 2006-144102

DISCLOSURE OF THE INVENTION

Problems to be Solved by the Invention

The present invention is proposed in view of the circumstances described above, and an object thereof is to provide a method for manufacturing a nickel and cobalt mixed sulfide, the method capable of stabilizing the concentrations of nickel and cobalt in a sulfidation end solution at low levels and suppressing a decrease in recovery rates of nickel and cobalt without increasing cost even in a case where a sulfuric acid solution containing nickel and cobalt and having a high iron ions concentration is treated as the sulfidation starting solution.

Means for Solving the Problems

The present inventors have conducted intensive studies to solve the aforementioned problems. As a result, it has been found that when the sulfidation reaction is caused by blowing a hydrogen sulfide gas into a sulfuric acid solution containing nickel and cobalt and containing iron ions at 1.0 to 4.0 g/L and repeatedly adding a sodium hydrogensulfide (NaHS) solution obtained by absorbing a hydrogen sulfide gas-containing exhaust gas generated by the sulfidation reaction into an alkaline solution, the concentrations of nickel and cobalt in the sulfidation end solution can be stabilized at low levels and a decrease in the recovery rates of nickel and cobalt can be suppressed. Thus, the present invention has been completed. That is, the present invention provides the following.

(1) A first invention of the present invention is a method for manufacturing a nickel and cobalt mixed sulfide, the method including: blowing a hydrogen sulfide gas into a sulfuric acid solution containing nickel and cobalt to cause a sulfidation reaction, thereby obtaining a nickel and cobalt mixed sulfide, in which the sulfuric acid solution contains iron ions at 1.0 to 4.0 g/L, and a sulfidation reaction is caused by blowing the hydrogen sulfide gas into the sulfuric acid solution and adding sodium hydrogensulfide obtained by absorbing a hydrogen sulfide gas-containing exhaust gas generated by the sulfidation reaction into an alkaline solution.

(2) A second invention of the present invention is the method for manufacturing a nickel and cobalt mixed sulfide in the first invention, in which an added amount of the sodium hydrogensulfide is equal to or more than an equivalent amount necessary for sulfidation of the iron ions contained in the sulfuric acid solution.

(3) A third invention of the present invention is the method for manufacturing a nickel and cobalt mixed sulfide in the first or second invention, in which regarding the amount of the sodium hydrogensulfide added, a solution containing the sodium hydrogensulfide at 20 to 35% by mass is contained at 1.7 to 3.8 m$^3$/H with respect to 1000 m$^3$/H of the sulfuric acid solution.

(4) A fourth invention of the present invention is the method for manufacturing a nickel and cobalt mixed sulfide in any one of the first to third inventions, in which a blowing amount of the hydrogen sulfide gas is 1.5 to 2.5 times a theoretical equivalent amount necessary for sulfidation of nickel and cobalt contained in the sulfuric acid solution.

(5) A fifth invention of the present invention is the method for manufacturing a nickel and cobalt mixed sulfide in any one of the first to fourth inventions, in which the alkaline solution is a sodium hydroxide solution.

(6) A sixth invention of the present invention is a nickel oxide ore hydrometallurgical method by which a nickel and cobalt mixed sulfide is generated from a leachate containing nickel and cobalt obtained by carrying out a leaching treatment using sulfuric acid on a nickel oxide ore, the method including: a sulfidation step in which a sulfidation reaction is caused by blowing a hydrogen sulfide gas into the leachate to obtain a nickel and cobalt mixed sulfide, in which the leachate contains iron ions at 1.0 to 4.0 g/L, and in the sulfidation step, a sulfidation reaction is caused by blowing the hydrogen sulfide gas into the leachate and adding sodium hydrogensulfide obtained by absorbing a hydrogen sulfide gas-containing exhaust gas generated by the sulfidation reaction into an alkaline solution.

Effects of the Invention

According to the present invention, even in a case where a sulfidation starting solution having a high iron ions concentration is treated, the concentrations of nickel and cobalt in the sulfidation end solution can be stabilized at low levels and a decrease in recovery rates of nickel and cobalt can be suppressed without increasing cost.

PREFERRED MODE FOR CARRYING OUT THE INVENTION

Hereinafter, a specific embodiment of the present invention (hereinafter, referred to as "the present embodiment") will be described in detail with reference to the drawings. Incidentally, the present invention is not limited to the following embodiment, and various modifications can be made within the range that does not change the spirit of the present invention.

<<1. Method for Manufacturing Nickel and Cobalt Mixed Sulfide>>

A method for manufacturing a nickel and cobalt mixed sulfide according to the present embodiment is a method including blowing a hydrogen sulfide gas into a sulfuric acid solution containing nickel and cobalt to cause a sulfidation reaction, thereby obtaining a nickel and cobalt mixed sulfide. Herein, the mixed sulfide refers to a mixture of nickel sulfide and cobalt sulfide. Hereinafter, the nickel and cobalt mixed sulfide is simply referred to as "mixed sulfide."

Specifically, this method for manufacturing a mixed sulfide is characterized in that the sulfuric acid solution containing nickel and cobalt that is a sulfidation starting solution is a solution containing iron ions at 1.0 to 4.0 g/L, hydrogen sulfide ($H_2S$) gas as a sulfurizing agent is blown into the sulfuric acid solution and sodium hydrogensulfide (NaHS) obtained by absorbing a hydrogen sulfide gas-containing exhaust gas generated by the sulfidation reaction into an alkaline solution so as to cause a sulfidation reaction.

This method for manufacturing a mixed sulfide can be applied, for example, to a treatment in a sulfidation step in a nickel oxide ore hydrometallurgical method, as described later. At this time, a leachate obtained by carrying out a leaching treatment using sulfuric acid on a nickel oxide ore is used as the sulfuric acid solution containing nickel and cobalt. Incidentally, as described later, a neutralization end solution obtained by neutralizing, using a neutralizer, the leachate obtained through the leaching treatment may be used.

Iron is contained in the nickel oxide ore, and iron, which has not been fixed as hematite ($Fe_2O_3$) in the course of the leaching treatment, is contained as an impurity element in the leachate obtained through the leaching treatment with respect to such a nickel oxide ore. Further, since plant roots or the like are mixed in the nickel oxide ore serving as a raw material, when the carbon (C) grade in the nickel oxide ore is more than 0.2%, the ORP (oxidation reduction potential) of the leachate obtained by the leaching treatment is decreased so that iron is leached, and thus the iron ions concentration in the leachate becomes more than 1.0 g/L. Incidentally, since this iron is more difficult to separate than other impurity elements even when a neutralization treatment is carried out on the leachate, the iron is contained at a predetermined concentration also in the neutralization end solution obtained by carrying out the neutralization treatment.

Figure 1:
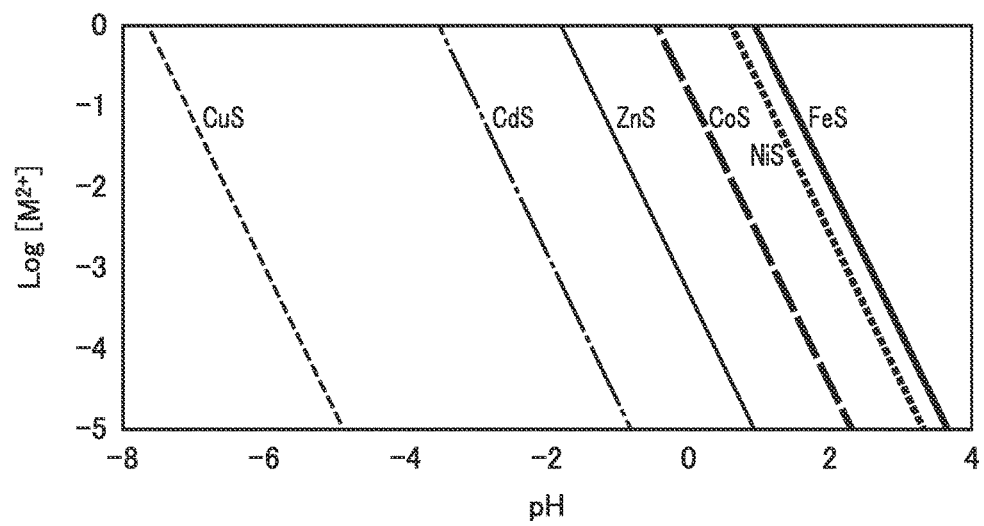
FIG. 1 is a graph showing the relationship between the pH of a solution and the solubilities of various metal sulfides.

Herein, upon generation of a mixed sulfide by the sulfidation reaction using the sulfuric acid solution containing nickel and cobalt, the pH at a terminating point of the reaction is mentioned as an important parameter of the sulfidation reaction. FIG. 1 is a graph showing the relationship between the pH of a solution and the solubilities of various metal sulfides. From the graph of FIG. 1, it is found that the solubilities of nickel sulfide (NiS) and cobalt sulfide (CoS) depend on pH. Therefore, as the pH becomes higher, the form of the sulfide in the sulfidation end solution is maintained and the concentrations of nickel ions and cobalt ions are decreased. That is, the recovery rate of the nickel and cobalt mixed sulfide is improved.

However, in the sulfidation reaction using the hydrogen sulfide gas as the sulfurizing agent, when the reaction of the following Reaction Formula (i) proceeds, the pH in the reaction system is gradually decreased over time and NiS or CoS is redissolved in the solution.

$$H_2S + NiSO_4 \Leftrightarrow H_2SO_4 + NiS \quad (i)$$

Figure 2:
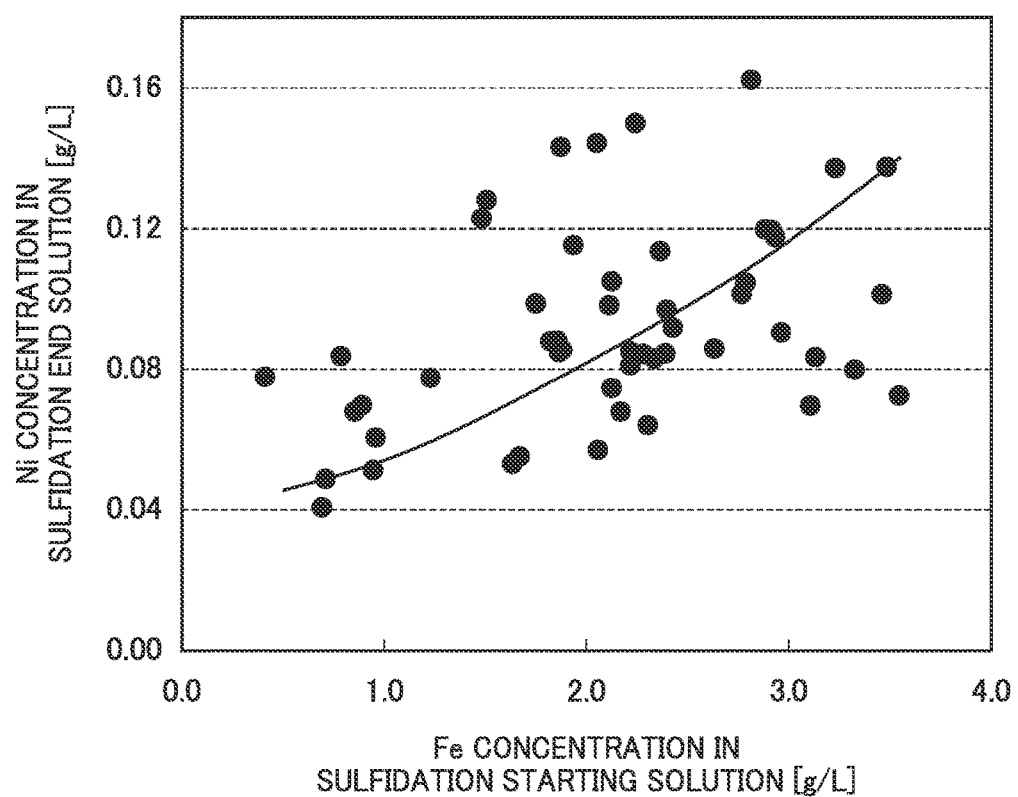
FIG. 2 is a graph showing the relationship between the iron ions concentration in the sulfidation starting solution and the nickel concentration in the sulfidation end solution.

Further, as the concentration of iron ions that is the impurity contained in the sulfidation starting solution becomes higher, as shown in FIG. 1, iron becomes sulfides together with both nickel and cobalt, resulting in a decrease in pH in the solution. As a result, redissolving of NiS is promoted. FIG. 2 is a graph showing the relationship between the iron ions concentration in the sulfidation starting solution and the nickel concentration in the sulfidation end solution. As shown in FIG. 2, it is clearly found that as the iron ions concentration in the sulfidation starting solution becomes higher, the pH of the solution decreases to promote redissolving of NiS as described above, and as a result, the nickel concentration in the sulfidation end solution tends to increase.

Herein, in the method for manufacturing a mixed sulfide according to the present embodiment, upon generation of the mixed sulfide by causing the sulfidation reaction with respect to the sulfuric acid solution containing nickel and cobalt which contains iron ions at 1.0 to 4.0 g/L, the sulfidation reaction is caused by blowing in a predetermined amount of a hydrogen sulfide gas, subjecting a hydrogen sulfide gas-containing exhaust gas generated by the sulfidation reaction to an alkaline treatment, and adding a solution containing sodium hydrogensulfide obtained by the alkaline treatment (hereinafter, also referred to as "NaHS solution").

By adding the NaHS solution obtained by subjecting the exhaust gas generated by the sulfidation reaction to the alkaline treatment to the sulfidation starting solution the reactions represented by the following Reaction Formulae (ii) and (iii) proceed and neutralization of the acid generated in the reaction represented by the aforementioned Reaction Formula (i) is carried out. According to this, decreasing in the pH of the solution is suppressed, the concentrations of nickel and cobalt in the end solution can be maintained low, and the recovery rates of nickel and cobalt can be improved. Moreover, the sulfidation reaction can be promoted on the basis of Reaction Formula (iii), and the use efficiency of the hydrogen sulfide gas can be improved by reusing the hydrogen sulfide gas excessively added as described later.

$$2NaHS + H_2SO_4 \rightarrow Na_2SO_4 + 2H_2S \quad (ii)$$

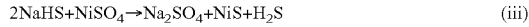
$$2NaHS + NiSO_4 \rightarrow Na_2SO_4 + NiS + H_2S \quad (iii)$$

As described above, by adding the hydrogen sulfide gas to cause the sulfidation reaction and adding the NaHs solution, a decrease in pH in the reaction system according to the sulfidation reaction is suppressed, and thus redissolving of NiS and CoS can be decreased. According to this, even in a case where a sulfidation starting solution having a high iron ions concentration is treated, the concentration of nickel in the sulfidation end solution can be stabilized at a low level and a decrease in recovery rates of nickel and cobalt as the mixed sulfide can be effectively suppressed without increasing cost. Incidentally, the added amount of the NaHS solution is equal to or more than the equivalent amount necessary for sulfidation of the iron ions contained in the sulfidation starting solution.

In the present embodiment, regarding the blowing amount of the hydrogen sulfide gas with respect to the sulfuric acid solution containing nickel and cobalt, in order to obtain a desired recovery rate and provide, as the exhaust gas, a surplus for the alkaline treatment, an excessive amount thereof that is 1.5 to 2.5 times the necessary theoretical equivalent amount is added. According to this, sulfidation, which is represented by Reaction Formula (i), of nickel and cobalt contained in the sulfidation starting solution is caused and the surplus hydrogen sulfide gas, which has not been consumed in the reaction represented by Reaction Formula (i), is discharged outside the system to be provided to the alkaline treatment.

Herein, in the present embodiment, it is characterized in that NaHS is generated by providing the surplus hydrogen sulfide gas to the alkaline treatment and a solution containing the NaHS is recovered to be repeatedly added in the sulfidation reaction.

Figure 3:
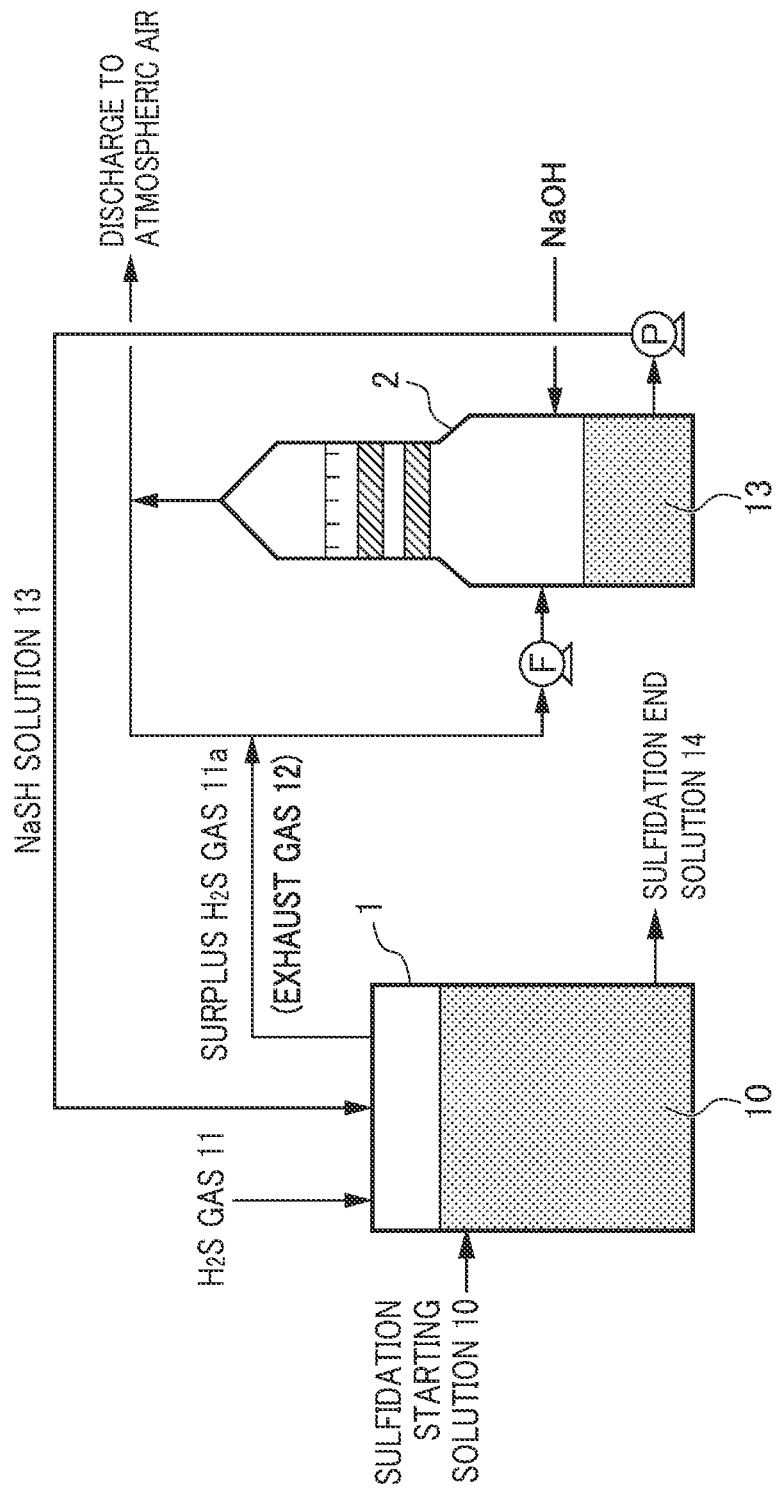
FIG. 3 is a diagram schematically illustrating the flow of recovering a surplus hydrogen sulfide gas to be provided to an alkaline treatment and supplying the obtained NaHS solution to a sulfidation reaction.

Specifically, FIG. 3 schematically illustrates the flow of recovering a surplus hydrogen sulfide gas to provide the surplus hydrogen sulfide gas to a detoxification treatment using an alkaline solution (hereinafter, simply referred to as "alkaline treatment") and supplying the obtained NaHS solution to a sulfidation reaction. As illustrated in FIG. 3, in a sulfidation reaction tank 1 loaded with a sulfidation starting solution 10, a hydrogen sulfide gas 11 is blown into the gas phase of the reaction tank 1 to cause a sulfidation reaction so that nickel and cobalt are obtained as sulfides. At this time, in the sulfidation reaction tank 1, as the hydrogen sulfide gas, an excessive amount thereof that is 1.5 to 2.5 times the theoretical equivalent amount necessary for the sulfidation treatment of nickel and cobalt is blown in. The surplus hydrogen sulfide gas 11a which has not been used in the sulfidation reaction is recovered as an exhaust gas 12 and the alkaline treatment is carried out in an H$_2$S gas cleaning tower 2. In this alkaline treatment, the hydrogen sulfide gas is brought into contact with the alkaline solution to cause a reaction of absorbing hydrogen sulfide into the alkaline solution, and thus a NaHS solution 13 is obtained by the reaction represented by the following Reaction Formula (iv).

$$NaOH + H_2S \rightarrow NaHS + H_2O \quad (iv)$$

In the method for manufacturing a mixed sulfide according to the present embodiment, it is characterized in that the NaHS solution 13 obtained in this way is added to the sulfidation starting solution 10 loaded into the sulfidation reaction tank 1 by using a pump or the like. According to this method, the NaHS solution repeatedly added is also used in the sulfidation reaction and a decrease in pH in the reaction system according to the sulfidation reaction is suppressed. According to this, redissolving of the generated NiS and CoS is decreased, and even when the sulfidation starting solution 10 having a high iron ions concentration is treated, the nickel concentration in the sulfidation end solution 14 to be obtained can be stabilized at a low level.

The system of adding, to the sulfidation starting solution, the NaHS solution obtained by subjecting the hydrogen sulfide gas discharged from the sulfidation reaction tank to the alkaline treatment is not particularly limited, but as described above, a recirculation system as illustrated in FIG. 3 can be employed. That is, it is possible to employ a system in which the exhaust gas 12 containing the surplus hydrogen sulfide gas 11a is obtained as the NaHS solution 13 in the H$_2$S gas cleaning tower 2 that recirculates the alkaline solution and the obtained NaHS solution 13 that is waste is repeated to the sulfidation reaction tank 1. Incidentally, in the H$_2$S gas cleaning tower 2, in order to efficiently bring the hydrogen sulfide gas into contact with the alkaline solution, it is preferable to provide a detoxifying facility such as a scrubber.

The alkaline solution used in the alkaline treatment in the H$_2$S gas cleaning tower 2 is not particularly limited, but from the industrial point of view, it is preferable to use a sodium hydroxide (NaOH) solution that has a high alkali strength and is easily handled as a solution. Specifically, the concentration of the sodium hydroxide solution is preferably about 20 to 30% by mass. When the concentration of the sodium hydroxide is less than 20%, the concentration becomes low so that the amount of the sodium hydroxide solution is increased. On the other hand, when the concentration is more than 30%, there is a possibility that unreacted sodium hydroxide remains.

The NaHS solution obtained by the alkaline treatment is, for example, a 20 to 35% by mass NaHS solution. As described above, in the present embodiment, the sulfidation reaction is caused by repeatedly adding the NaHS solution to the sulfidation reaction tank, but regarding the added amount thereof, the NaHS solution is preferably added at about 1.7 to 3.8 m$^3$/H with respect to 1000 m$^3$/H of the sulfuric acid solution containing nickel and cobalt serving as the sulfidation starting solution.

When the added amount of NaHS is less than 1.7 m$^3$/H with respect to 1000 m$^3$/H of the sulfuric acid solution, there is a possibility that the effect of increasing pH that is a desired effect, in other words, the effect of suppressing a decrease in pH may not be sufficiently achieved. On the other hand, when the added amount is more than 3.8 m$^3$/H with respect to 1000 m$^3$/H of the sulfuric acid solution, not only the recovery rates of nickel and cobalt are not increased but also the mixing of Fe in the product is promoted by an excessive increase in pH, which is not preferable.

<<2. Application to Nickel Oxide Ore Hydrometallurgical Method>>

In the method for manufacturing a mixed sulfide according to the present embodiment, the sulfuric acid solution containing nickel and cobalt is used as the sulfidation starting solution and then the sulfidation reaction is caused by adding the hydrogen sulfide gas and the NaHS solution obtained by the alkaline treatment to the solution. Herein, as the sulfuric acid solution containing nickel and cobalt, for example, a leachate obtained by carrying out a leaching treatment using sulfuric acid on a nickel oxide ore can be used, and the sulfidation reaction is caused with respect to the leachate to thereby obtain a nickel and cobalt mixed sulfide.

As described above, the method for manufacturing a mixed sulfide according to the present embodiment can be applied to a sulfidation step in a hydrometallurgical method for recovering nickel from a nickel oxide ore.

Hereinafter, the outline of the nickel oxide ore hydrometallurgical method will be described, and a specific embodiment in which the aforementioned method for manufacturing a mixed sulfide is applied to the treatment in the sulfidation step in the hydrometallurgical method will be described. Incidentally, a description will be given using a hydrometallurgical method involving a high temperature pressure acid leaching method of performing leaching under high temperature and high pressure (hereinafter, also referred to as "HPAL method") as an example of the nickel oxide ore hydrometallurgical method.

<2-1. Regarding Each Step of the Nickel Oxide Ore Hydrometallurgical Method>

Figure 4:
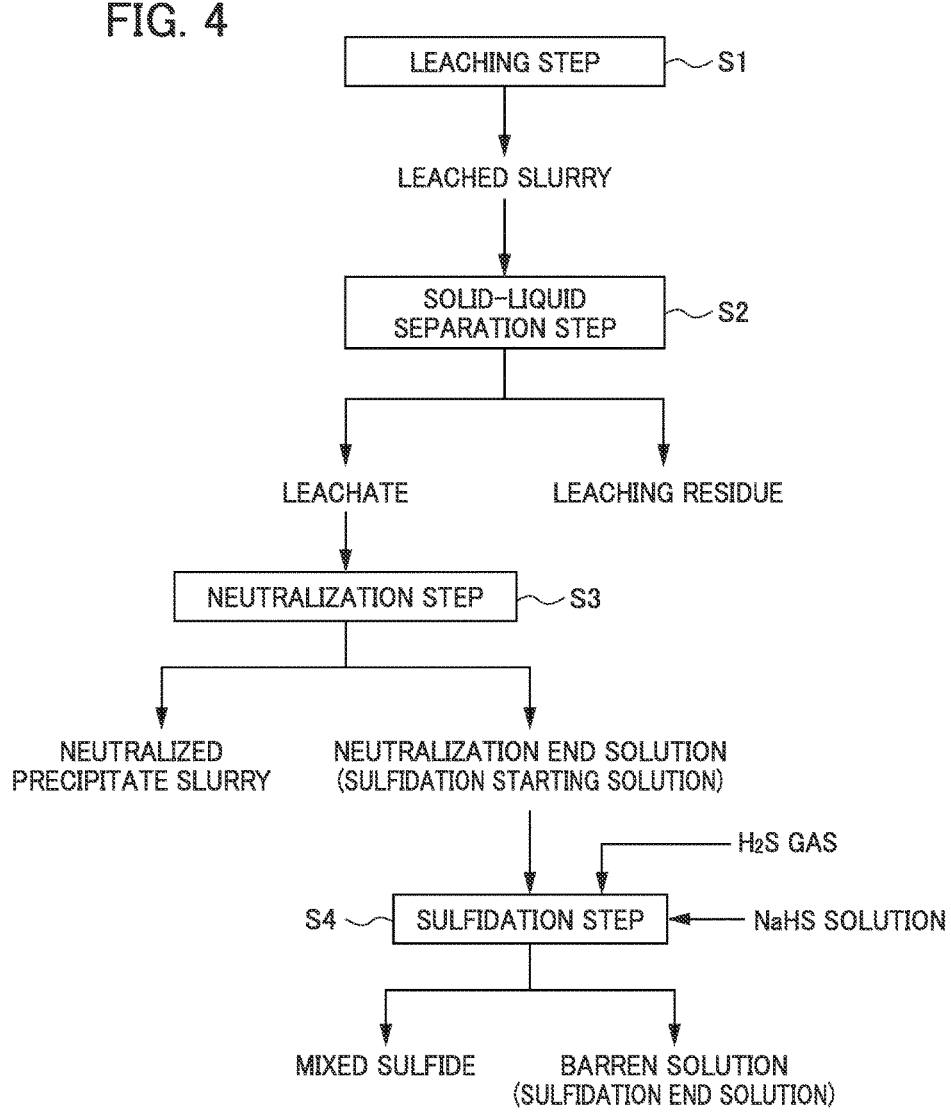
FIG. 4 is a process diagram illustrating an example of the flow of the nickel oxide ore hydrometallurgical method.

FIG. 4 is a process diagram illustrating an example of the flow of the nickel oxide ore hydrometallurgical method. As illustrated in FIG. 4, the nickel oxide ore hydrometallurgical method includes: a leaching step S1 in which a leaching treatment is carried out under high temperature and high pressure by adding sulfuric acid to a slurry of a nickel oxide ore serving as a raw material; a solid-liquid separation step S2 in which a residue is separated from the leached slurry to obtain a leachate containing nickel and cobalt; a neutralization step S3 in which impurity elements in the leachate are separated as a neutralized precipitate slurry by adjusting the pH of the leachate to obtain a neutralization end solution; and a sulfidation step S4 in which a nickel and cobalt mixed sulfide is generated by adding a hydrogen sulfide gas as a sulfurizing agent to the neutralization end solution.

(1) Leaching Step

In the leaching step S1, using a high temperature pressurizing reaction tank such as an autoclave, sulfuric acid is added to a slurry of the nickel oxide ore (hereinafter, also referred to as "ore slurry") and then the obtained mixture is stirred under the condition of a temperature of about 230 to 270° C. and a pressure of about 3 to 5 MPa, thereby generating a leached slurry composed of a leachate and a leaching residue.

As the nickel oxide ore, a so-called laterite ore such as a limonite ore and a saprolite ore is mainly exemplified. The content of nickel in the laterite ore is typically 0.8 to 2.5% by weight and nickel is contained as a hydroxide or magnesium silicate mineral. Further, the content of iron is 10 to 50% by weight and iron is mainly in the form of a trivalent hydroxide; however, some divalent iron is contained in a silica-magnesia mineral. Further, in the leaching step S1, in addition to such a laterite ore, an oxide ore containing valuable metals such as nickel, cobalt, manganese, and copper, for example, manganese nodules existing at the bottom of the deep part of the sea, or the like can be used.

In the leaching treatment in the leaching step S1, for example, a leaching reaction and a high temperature thermal hydrolysis reaction represented by the following Formulae (a) to (e) occur so that leaching of nickel, cobalt, and the like as sulfates and fixation of the leached iron sulfate as hematite are performed. However, since the fixation of iron ions does not proceed to completion, the liquid portion of the leached slurry thus obtainable usually contains divalent and trivalent iron ions in addition to nickel, cobalt and the like. Incidentally, in this leaching step S1, from the viewpoint of filterability of the leaching residue, which contains hematite, generated in the solid-liquid separation step S2 of the subsequent step, it is preferable for the pH of the obtained leachate to be adjusted to 0.1 to 1.0.

Leaching Reaction $$MO + H_2SO_4 \Rightarrow MSO_4 + H_2O \quad (a)$$

(incidentally, M in the formula represents Ni, Co, Fe, Zn, Cu, Mg, Cr, Mn, or the like)

$$2Fe(OH)_3 + 3H_2SO_4 \Rightarrow Fe_2(SO_4)_3 + 6H_2O \quad (b)$$

$$FeO + H_2SO_4 \Rightarrow FeSO_4 + H_2O \quad (c)$$

High Temperature Thermal Hydrolysis Reaction $$2FeSO_4 + H_2SO_4 + \tfrac{1}{2}O_2 \Rightarrow Fe_2(SO_4)_3 + H_2O \quad (d)$$

$$Fe_2(SO_4)_3 + 3H_2O \Rightarrow Fe_2O_3 + 3H_2SO_4 \quad (e)$$

Incidentally, the amount of sulfuric acid added to the autoclave loaded with the ore slurry is not particularly limited, but such an excessive amount that the iron in the ore is leached is used. For example, the added amount is set to 300 to 400 kg per 1 tonne of the ore.

(2) Solid-Liquid Separation Step

In the solid-liquid separation step S2, the leached slurry generated in the leaching step S1 is washed in multiple stages to obtain a leachate containing valuable metals such as nickel and cobalt and a leaching residue.

In the solid-liquid separation step S2, the leached slurry is mixed with a rinsing liquid and then subjected to the solid-liquid separation treatment by using a solid-liquid separation device such as a thickener. Specifically, first, the leached slurry is diluted with the rinsing liquid, and then the leaching residue in the leached slurry is condensed as a precipitate in the thickener. According to this, the nickel adhered to the leaching residue can be decreased depending on the degree of dilution. Incidentally, in a real operation, a thickener with such capability is coupled in a multistage way so that the recovery rate of nickel can be improved.

(3) Neutralization Step

In the neutralization step S3, while oxidation of the leachate is suppressed, a neutralizer such as magnesium oxide or calcium carbonate is added to adjust the pH to 4 or less, thereby obtaining a neutralized precipitate slurry containing trivalent iron and a neutralization end solution that is a mother liquor for recovering nickel.

In the neutralization step S3, while oxidation of the separated leachate is suppressed, a neutralizer such as calcium carbonate is added to the leachate to adjust the pH of a neutralization end solution to be obtained to 4 or less, preferably 3.0 to 3.5, more preferably 3.1 to 3.2, thereby forming a neutralization end solution that is a mother liquor for recovering nickel and cobalt and a neutralized precipitate slurry containing trivalent iron as an impurity element. In the neutralization step S3, by carrying out the neutralization treatment to the leachate in this way, excessive acid is neutralized using a leaching treatment according to a HPAL method to generate a neutralization end solution and impurities such as trivalent iron ions and aluminum ions remaining in the solution are removed as neutralized precipitates.

Incidentally, the neutralization end solution is, as described above, a solution based on the leachate obtained by carrying out leaching treatment using sulfuric acid on the nickel oxide ore serving as a raw material in the leaching step S1 and is a sulfuric acid solution containing nickel. This neutralization end solution becomes a reaction starting solution of the sulfidation reaction in the sulfidation step S4 described later and the nickel concentration therein is in a range of about 0.5 to 5.0 g/L. Further, in this neutralization end solution, cobalt is contained as a valuable metal in addition to nickel. Furthermore, even if the neutralization end solution is a solution obtained by carrying out a cleaning treatment, iron, manganese, magnesium, aluminum, chromium, lead, and the like may be contained. Specifically, iron ions is contained at 1.0 to 4.0 g/L.

[Sulfidation Step]

In the sulfidation step S4, by using the neutralization end solution, which is a mother liquor for recovering nickel and cobalt, as a sulfidation starting solution and blowing the hydrogen sulfide gas as a sulfurizing agent into the sulfidation starting solution, the sulfidation reaction is caused to generate a nickel and cobalt mixed sulfide with less impurity components and a sulfidation end solution that is a barren solution and in which the concentrations of nickel and cobalt are stabilized at low levels.

Incidentally, in a case where zinc is contained in the neutralization end solution, zinc can be selectively separated as a sulfide before separating nickel and cobalt as sulfides.

The sulfidation treatment in the sulfidation step S4 can be carried out using a sulfidation reaction tank or the like, and a sulfidation reaction is caused with respect to the sulfidation starting solution introduced into the sulfidation reaction tank by blowing a hydrogen sulfide gas into the gas phase part in the reaction tank and dissolving the hydrogen sulfide gas in the solution. According to this sulfidation treatment, nickel and cobalt contained in the sulfidation starting solution are fixed as the mixed sulfide.

After the completion of the sulfidation reaction, a slurry containing the obtained nickel and cobalt mixed sulfide is loaded into a sedimentation and separation device such as a thickener and then only the mixed sulfide is separated and recovered from the bottom portion of the thickener by carrying out a sedimentation and separation treatment on the slurry. Meanwhile, the aqueous solution components are overflowed from the upper portion of the thickener and recovered as a barren solution.

<2-2. Regarding the Sulfidation Step of the Hydrometallurgical Method>

Herein, in the treatment in the sulfidation step S4, that is, the sulfidation treatment in which the nickel and cobalt mixed sulfide is generated from the neutralization end solution that is a sulfuric acid solution containing nickel and cobalt, the aforementioned method for manufacturing a mixed sulfide can be employed using the neutralization end solution as the sulfidation starting solution.

That is, in the sulfidation step S4 in the present embodiment, the sulfidation reaction is caused by blowing the hydrogen sulfide gas into the neutralization end solution that is a sulfuric acid solution containing nickel and cobalt and in which the iron ions concentration is 1.0 to 4.0 g/L and adding the NaHS solution obtained by absorbing a hydrogen sulfide gas-containing exhaust gas generated by the sulfidation reaction into an alkaline solution.

The specific method of the sulfidation treatment is the same as in the aforementioned method for manufacturing a nickel and cobalt mixed sulfide, and thus the detailed description thereof is herein omitted; however, in the present embodiment, the excessive amount of the hydrogen sulfide gas that is 1.5 to 2.5 times the theoretical equivalent amount necessary for the sulfidation treatment of nickel and cobalt is blown in and surplus hydrogen sulfide gas, which has not been used in the sulfidation reaction, is brought into contact with the alkaline solution by the alkaline treatment to thereby obtain NaHS. A solution containing NaHS obtained by subjecting the surplus hydrogen sulfide gas to the alkaline treatment in this way is repeatedly used in the sulfidation reaction.

In the present embodiment, as described above, by adding the hydrogen sulfide gas to cause the sulfidation reaction and adding the NaHS solution, a decrease in pH in the reaction system according to the sulfidation reaction is suppressed, and thus redissolving of NiS and CoS is decreased. According to this, even in a case where a sulfidation starting solution having a high iron ions concentration is treated, a decrease in recovery rate of the nickel and cobalt mixed sulfide can be effectively suppressed without increasing cost.

EXAMPLES

Hereinafter, the present invention will be described in more detail by means of Examples, but the present invention is not limited to the following Examples at all.

Example 1

A sulfuric acid solution having a nickel concentration of 1.0 to 3.0 g/L, a cobalt concentration of 1.0 to 3.0 g/L, and an iron ions concentration of 1.0 to 2.0 g/L was used as a sulfidation starting solution and loaded into a sulfidation reaction tank, and then a sulfidation reaction was caused while blowing in a hydrogen sulfide gas.

At this time, the blowing amount of the hydrogen sulfide gas was set to 0.30 to 0.85 $Nm^3/kg \cdot Ni$ and a solution containing sodium hydrogensulfide (NaHS) was added to the sulfuric acid solution. The added amount of the NaHS solution was set at 1.7 to 3.8 m$^3$/H with respect to 1000 m$^3$/H of the sulfuric acid solution. Incidentally, this NaHS was obtained by bringing a surplus hydrogen sulfide gas-containing exhaust gas generated by the sulfidation reaction into contact with the sodium hydroxide solution, and this NaHS was repeatedly added to the sulfuric acid solution in the sulfidation reaction tank.

By carrying out the sulfidation reaction in this way, a mixed sulfide in which nickel and cobalt were obtained as sulfides in the sulfuric acid solution serving as the sulfidation starting solution was obtained. The obtained mixed sulfide was separated from an aqueous solution component by a sedimentation and separation treatment using a thickener, and then the concentration of nickel in the sulfidation end solution which is the aqueous solution component was analyzed.

As a result, the nickel concentration in the sulfidation end solution was less than 0.10 g/L and could be stabilized at a low level.

Comparative Example 1

Similarly to Example 1, a sulfuric acid solution containing nickel and cobalt and containing iron ions at 1.0 to 2.0 g/L was used as a sulfidation starting solution to cause a sulfidation reaction.

At this time, in Comparative Example 1, a hydrogen sulfide gas was blown in and a NaHS solution was added to the sulfuric acid solution at 1.0 to 1.5 m$^3$/H with respect to 1000 m$^3$/H of the sulfuric acid solution. Incidentally, also regarding this NaHS, one obtained by bringing a surplus hydrogen sulfide gas-containing exhaust gas generated by the sulfidation reaction into contact with the sodium hydroxide solution was used.

By carrying out the sulfidation reaction in this way, a mixed sulfide in which nickel and cobalt were obtained as sulfides in the sulfuric acid solution serving as the sulfidation starting solution was obtained. The obtained mixed sulfide was separated from an aqueous solution component by a sedimentation and separation treatment using a thickener, and then the concentration of nickel in the sulfidation end solution which is the aqueous solution component was analyzed.

As a result, the nickel concentration in the sulfidation end solution was more than 0.10 g/L so that the nickel concentration became high. The reason for this is considered that a decrease in pH of the solution cannot be suppressed and redissolving of the generated NiS is promoted.

EXPLANATION OF REFERENCE NUMERALS

1 SULFIDATION REACTION TANK
2 H$_2$S GAS CLEANING TOWER
10 SULFIDATION STARTING SOLUTION
11 HYDROGEN SULFIDE GAS
11a SURPLUS HYDROGEN SULFIDE GAS
12 EXHAUST GAS
13 NaHS SOLUTION
14 SULFIDATION END SOLUTION

The invention claimed is:
1. A method for manufacturing a nickel and cobalt mixed sulfide, the method comprising:

blowing a hydrogen sulfide gas into a sulfuric acid solution containing nickel and cobalt to cause a sulfidation reaction, thereby obtaining a nickel and cobalt mixed sulfide, wherein
the sulfuric acid solution contains iron ions at 1.0 to 4.0 g/L, and
a sulfidation reaction is caused by blowing the hydrogen sulfide gas into the sulfuric acid solution and adding sodium hydrogensulfide (NaHS) obtained by absorbing a hydrogen sulfide gas-containing exhaust gas generated by the sulfidation reaction into an alkaline solution.

2. The method for manufacturing a nickel and cobalt mixed sulfide according to claim 1, wherein an added amount of the sodium hydrogensulfide is equal to or more than an equivalent amount necessary for sulfidation of the iron ions contained in the sulfuric acid solution.

3. The method for manufacturing a nickel and cobalt mixed sulfide according to claim 2, wherein regarding the amount of the sodium hydrogensulfide added, a solution containing the sodium hydrogensulfide at 20 to 35% by mass is contained at 1.7 to 3.8 m$^3$/H with respect to 1000 m$^3$/H of the sulfuric acid solution.

4. The method for manufacturing a nickel and cobalt mixed sulfide according to claim 3, wherein a blowing amount of the hydrogen sulfide gas is 1.5 to 2.5 times a theoretical equivalent amount necessary for sulfidation of nickel and cobalt contained in the sulfuric acid solution.

5. The method for manufacturing a nickel and cobalt mixed sulfide according to claim 4, wherein the alkaline solution is a sodium hydroxide solution.

6. The method for manufacturing a nickel and cobalt mixed sulfide according to claim 3, wherein the alkaline solution is a sodium hydroxide solution.

7. The method for manufacturing a nickel and cobalt mixed sulfide according to claim 2, wherein a blowing amount of the hydrogen sulfide gas is 1.5 to 2.5 times a theoretical equivalent amount necessary for sulfidation of nickel and cobalt contained in the sulfuric acid solution.

8. The method for manufacturing a nickel and cobalt mixed sulfide according to claim 7, wherein the alkaline solution is a sodium hydroxide solution.

9. The method for manufacturing a nickel and cobalt mixed sulfide according to claim 2, wherein the alkaline solution is a sodium hydroxide solution.

10. The method for manufacturing a nickel and cobalt mixed sulfide according to claim 1, wherein regarding the amount of the sodium hydrogensulfide added, a solution containing the sodium hydrogensulfide at 20 to 35% by mass is contained at 1.7 to 3.8 m$^3$/H with respect to 1000 m$^3$/H of the sulfuric acid solution.

11. The method for manufacturing a nickel and cobalt mixed sulfide according to claim 10, wherein a blowing amount of the hydrogen sulfide gas is 1.5 to 2.5 times a theoretical equivalent amount necessary for sulfidation of nickel and cobalt contained in the sulfuric acid solution.

12. The method for manufacturing a nickel and cobalt mixed sulfide according to claim 11, wherein the alkaline solution is a sodium hydroxide solution.

13. The method for manufacturing a nickel and cobalt mixed sulfide according to claim 10, wherein the alkaline solution is a sodium hydroxide solution.

14. The method for manufacturing a nickel and cobalt mixed sulfide according to claim 1, wherein a blowing amount of the hydrogen sulfide gas is 1.5 to 2.5 times a theoretical equivalent amount necessary for sulfidation of nickel and cobalt contained in the sulfuric acid solution.

15. The method for manufacturing a nickel and cobalt mixed sulfide according to claim 14, wherein the alkaline solution is a sodium hydroxide solution.

16. The method for manufacturing a nickel and cobalt mixed sulfide according to claim 1, wherein the alkaline solution is a sodium hydroxide solution.

17. A nickel oxide ore hydrometallurgical method by which a nickel and cobalt mixed sulfide is generated from a leachate containing nickel and cobalt obtained by carrying out a leaching treatment using sulfuric acid on a nickel oxide ore, the method comprising:

a sulfidation step in which a sulfidation reaction is caused by blowing a hydrogen sulfide gas into the leachate to obtain a nickel and cobalt mixed sulfide, wherein the leachate contains iron ions at 1.0 to 4.0 g/L, and in the sulfidation step, a sulfidation reaction is caused by blowing the hydrogen sulfide gas into the leachate and adding sodium hydrogensulfide (NaHS) obtained by absorbing a hydrogen sulfide gas-containing exhaust gas generated by the sulfidation reaction into an alkaline solution.

* * * * *